US012409545B2

(12) United States Patent
Chang

(10) Patent No.: US 12,409,545 B2
(45) Date of Patent: Sep. 9, 2025

(54) TOOL HOLDER RAIL AND TOOL HOLDER INCLUDING THE SAME

(71) Applicant: CHUN NIEN PLASTIC LTD., Taichung (TW)

(72) Inventor: Chi-Tsai Chang, Taichung (TW)

(73) Assignee: CHUN NIEN PLASTIC LTD., Taichung (TW)

( * ) Notice: Subject to any disclaimer, the term of this patent is extended or adjusted under 35 U.S.C. 154(b) by 61 days.

(21) Appl. No.: 18/496,187

(22) Filed: Oct. 27, 2023

(65) Prior Publication Data

US 2025/0135627 A1 May 1, 2025

(51) Int. Cl.
*B25H 3/00* (2006.01)

(52) U.S. Cl.
CPC .................................... *B25H 3/003* (2013.01)

(58) Field of Classification Search
CPC ............. B25H 3/003; B25H 3/04; B25H 3/02
USPC ....... 224/401; 211/113, 70.6, 13.1, 4, 94.01; 206/372, 378, 349, 806, 493, 376, 379, 206/1.5
See application file for complete search history.

(56) References Cited

U.S. PATENT DOCUMENTS 3,239,069 A * 3/1966 Hollins .................... A47K 5/02 206/385
3,408,758 A * 11/1968 Doring ............... B65D 73/0035 40/310
4,905,829 A * 3/1990 Stribiak ................. A45C 11/24 206/349
5,147,038 A * 9/1992 Pergeau ................... B25H 3/06 206/564
5,228,570 A * 7/1993 Robinson ................ B25B 13/56 81/177.85
5,255,795 A * 10/1993 Kitmitto .................. B25H 1/00 211/DIG. 1
5,388,338 A * 2/1995 Majors .................. E04F 21/241 33/376
5,405,025 A * 4/1995 Melrose ................... B25H 3/06 211/13.1
5,649,625 A * 7/1997 Ovadia ...................... A47F 7/02 206/493
5,715,951 A * 2/1998 Dembicks ............... B25B 13/56 206/378
5,862,913 A * 1/1999 Chou .................... A47F 5/0823 206/378
6,032,797 A * 3/2000 Kao ......................... B25H 3/04 206/349
6,092,655 A * 7/2000 Ernst ........................ B25H 3/06 206/378

(Continued)

*Primary Examiner* — Anthony D Stashick
*Assistant Examiner* — Prince Pal
(74) *Attorney, Agent, or Firm* — MUNCY, GEISSLER, OLDS & LOWE, P.C.

(57) ABSTRACT

A tool holder rail and a tool holder including the same are provided, wherein the tool holder rail includes: an elongate main body extending in a longitudinal direction and including two mounting sides extending in the longitudinal direction, the two mounting sides being inclined to each other with an included angle therebetween; and two rail slots disposed on the two mounting sides, respectively, each of the two rail slots including two flanges extending in the longitudinal direction and toward each other, each of the two rail slots being configured for slidable engagement of a tool seat.

13 Claims, 5 Drawing Sheets

(56) References Cited

U.S. PATENT DOCUMENTS 6,168,018 B1 * 1/2001 Ramsey ........ B25H 3/06 206/378
6,386,363 B1 * 5/2002 Huang ........ B25H 3/003 206/378
6,431,373 B1 * 8/2002 Blick ........ B25H 3/003 206/378
6,450,338 B1 * 9/2002 Chen ........ B25H 3/003 206/378
6,571,966 B1 * 6/2003 Hsiao ........ A47F 7/0028 206/379
6,886,791 B2 * 5/2005 Dettorre ........ B63B 32/83 211/94.01
7,066,339 B2 * 6/2006 Chiu ........ A47F 5/0807 211/183
7,108,132 B2 * 9/2006 Shih ........ B25H 3/003 206/459.1
7,118,406 B2 * 10/2006 Mu ........ H01R 25/142 211/70.6
7,360,654 B2 * 4/2008 Liu ........ B25H 3/003 206/754
7,658,284 B2 * 2/2010 Lin ........ B25H 3/003 221/70
7,677,391 B2 * 3/2010 Pistor ........ B25H 3/003 206/372
7,717,278 B2 * 5/2010 Kao ........ B25H 3/04 206/349
8,307,980 B1 * 11/2012 Kao ........ B25H 3/04 206/378
8,336,709 B1 * 12/2012 Geibel ........ B25H 3/06 206/378
8,387,791 B2 * 3/2013 Huang ........ B25H 3/022 206/378
8,397,912 B1 * 3/2013 Chen ........ B25H 3/003 206/379
8,469,190 B1 * 6/2013 Chang ........ B25H 3/003 206/375
8,499,935 B2 * 8/2013 Hsieh ........ B25H 3/04 206/349
8,622,369 B2 * 1/2014 Kania ........ B66F 5/04 254/2 B
9,126,329 B2 * 9/2015 Kao ........ F16M 13/022
9,138,890 B2 * 9/2015 Lee ........ B25H 3/003
9,186,790 B1 * 11/2015 Kao ........ B25H 3/003
9,527,206 B1 * 12/2016 Hsieh ........ B25H 3/04
9,528,303 B1 * 12/2016 Lai ........ A47F 5/0861
9,757,853 B2 * 9/2017 Su ........ B25H 3/04
9,937,615 B1 * 4/2018 Winnard ........ B25H 3/04
10,022,857 B2 * 7/2018 Kao ........ B25H 3/04
10,040,189 B2 * 8/2018 Kao ........ A47F 7/0028
10,272,547 B1 * 4/2019 Lai ........ B25B 13/06
10,589,416 B1 * 3/2020 Hsieh ........ F16B 2/22
10,675,750 B1 * 6/2020 Winnard ........ G09F 3/02
11,091,778 B2 * 8/2021 Winnard ........ A61K 39/12
11,298,813 B1 * 4/2022 Lelonek ........ B25H 5/00
11,358,271 B2 * 6/2022 Chang ........ B25H 3/003
11,389,945 B1 * 7/2022 Kao ........ B25H 3/04
11,453,113 B1 * 9/2022 Hsieh ........ B25H 3/06
11,623,811 B2 * 4/2023 Buhl ........ B65D 81/052 206/522
11,667,029 B1 * 6/2023 Hsieh ........ B25H 3/04 206/372
11,813,730 B2 * 11/2023 Chang ........ B25H 3/04
11,850,725 B2 * 12/2023 Chang ........ B25H 3/003
11,999,047 B1 * 6/2024 Lin ........ B25H 3/003
2001/0001197 A1 * 5/2001 Ramsey ........ B25H 3/06 206/378
2004/0188366 A1 * 9/2004 Tong ........ B25H 3/003 206/378
2005/0103664 A1 * 5/2005 Shih ........ B25B 13/56 206/378
2005/0126943 A1 * 6/2005 Liu ........ B65D 73/0064 206/349
2005/0218023 A1 * 10/2005 Winnard ........ B25H 3/003 206/378
2005/0221664 A1 * 10/2005 Winnard ........ B25H 3/003 439/510
2006/0070903 A1 * 4/2006 Chiang ........ B25H 3/06 206/378
2006/0219647 A1 * 10/2006 Shih ........ B25H 3/003 211/70.6
2006/0234846 A1 * 10/2006 Tucker ........ B25H 3/04 483/26
2006/0254940 A1 * 11/2006 Mu ........ B25H 3/003 206/378
2007/0017886 A1 * 1/2007 Kao ........ A47F 7/0028 211/94.01
2008/0314949 A1 * 12/2008 Wang ........ A45F 5/02 224/666
2009/0001111 A1 * 1/2009 Lin ........ B25H 3/003 224/245
2009/0166305 A1 * 7/2009 Hsieh ........ A47F 7/0028 211/70.6
2009/0211932 A1 * 8/2009 Schmitt ........ B25H 3/003 206/373
2009/0218302 A1 * 9/2009 Winnard ........ B25H 3/003 211/70.6
2010/0072094 A1 * 3/2010 Taylor ........ B25H 3/003 206/372
2010/0072341 A1 * 3/2010 Kao ........ B25H 3/04 248/340
2011/0089126 A1 * 4/2011 Hsieh ........ B25H 3/06 211/70.6
2011/0233160 A1 * 9/2011 Chen ........ B25H 3/06 211/70.6
2012/0061339 A1 * 3/2012 Chang ........ B65D 73/0064 211/70.6
2013/0126449 A1 * 5/2013 Sh ........ B25H 3/04 211/70.6
2013/0240394 A1 * 9/2013 Wang ........ B25H 3/00 206/349
2013/0327665 A1 * 12/2013 Jehannet ........ B65D 85/54 206/372
2014/0209780 A1 * 7/2014 Chang ........ F16M 13/005 248/551
2014/0262887 A1 * 9/2014 Johnson ........ B65D 85/24 206/349
2015/0034518 A1 * 2/2015 Kao ........ B65D 73/0014 206/372
2015/0034572 A1 * 2/2015 Kao ........ B25B 13/06 211/13.1
2015/0122750 A1 * 5/2015 Kao ........ B25H 3/003 211/13.1
2015/0165615 A1 * 6/2015 Lee ........ B25H 3/003 206/349
2015/0251310 A1 * 9/2015 Ou ........ B25H 3/04 206/372
2016/0031074 A1 * 2/2016 Su ........ B25H 3/003 206/349
2016/0096264 A1 * 4/2016 Kao ........ B25H 3/06 206/378
2016/0221178 A1 * 8/2016 Hsieh ........ B25F 1/04
2016/0265596 A1 * 9/2016 Yu ........ F16D 3/185
2016/0271788 A1 * 9/2016 Hsieh ........ B25H 3/04
2017/0043475 A1 * 2/2017 Hsieh ........ B25H 3/04
2017/0232606 A1 * 8/2017 Kao ........ B25H 3/003 211/70.6
2017/0254365 A1 * 9/2017 Chen ........ F16D 3/221
2017/0259408 A1 * 9/2017 Zhang ........ B25B 13/06
2019/0091842 A1 * 3/2019 Chou ........ B25B 13/06
2019/0126461 A1 * 5/2019 Mefferd ........ B25H 3/04
2020/0101590 A1 * 4/2020 Winnard ........ B25H 3/003
2020/0147780 A1 * 5/2020 Kukucka ........ B25H 3/003
2020/0198118 A1 * 6/2020 Wang ........ B25B 13/56
2020/0376635 A1 * 12/2020 Raskin ........ B25B 23/0035
2020/0384631 A1 * 12/2020 Reed ........ B25H 3/04
2020/0406447 A1 * 12/2020 Hsieh ........ B25H 3/04
2021/0060761 A1 * 3/2021 Chang ........ B25H 3/003
2021/0122028 A1 * 4/2021 Hernandez, Jr. ........ B25H 3/06

(56) References Cited

U.S. PATENT DOCUMENTS

| | | | | |
|---|---|---|---|---|
| 2021/0156434 | A1* | 5/2021 | Yu | F16D 3/2057 |
| 2021/0339376 | A1* | 11/2021 | Winnard | B25H 3/04 |
| 2022/0097223 | A1* | 3/2022 | Chang | B25H 3/003 |
| 2023/0182282 | A1* | 6/2023 | Chang | B25H 3/06 206/349 |
| 2024/0246220 | A1* | 7/2024 | Chen | B25H 3/04 |
| 2025/0033187 | A1* | 1/2025 | Kao | B25H 3/003 |

* cited by examiner

TOOL HOLDER RAIL AND TOOL HOLDER INCLUDING THE SAME

BACKGROUND OF THE INVENTION

Field of the Invention

The present invention relates to a tool holder rail and a tool holder including the same.

Description of the Prior Art

Tools are often used to drive members to be driven, such as screws, nuts or the like. Because the members to be driven are of various sizes (or of the metric and imperial systems), it is necessary to prepare tools corresponding to members to be driven of various sizes. It is understandable that a large number of tools need to be placed and stored according to their sizes; otherwise it will be troubled when in use or not in use. Therefore, some storing racks and storage devices are developed.

However, the conventional storing rack or storage device includes only single one rail for slidable engagement of a tool seat, and the only single one rail is parallel to the attachment side of the conventional storing rack or storage device. As such, it has a small capacity of storing for tools so that it requires more storing rack or storage device to store the tools.

The present invention is, therefore, arisen to obviate or at least mitigate the above-mentioned disadvantages.

SUMMARY OF THE INVENTION

The main object of the present invention is to provide a tool holder rail and a tool holder including the same, which is capable of storing more tools and has a small volume.

To achieve the above and other objects, a tool holder rail is provided, wherein the tool holder rail includes: an elongate main body extending in a longitudinal direction and including two mounting sides extending in the longitudinal direction, the two mounting sides being inclined to each other with an included angle therebetween; and two rail slots disposed on the two mounting sides, respectively, each of the two rail slots including two flanges extending in the longitudinal direction and toward each other, each of the two rail slots being configured for slidable engagement of a tool seat.

To achieve the above and other objects, a tool holder is further provided, wherein the tool holder includes: the tool holder rail and a tool seat slidably engaged within one of the two rail slots.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
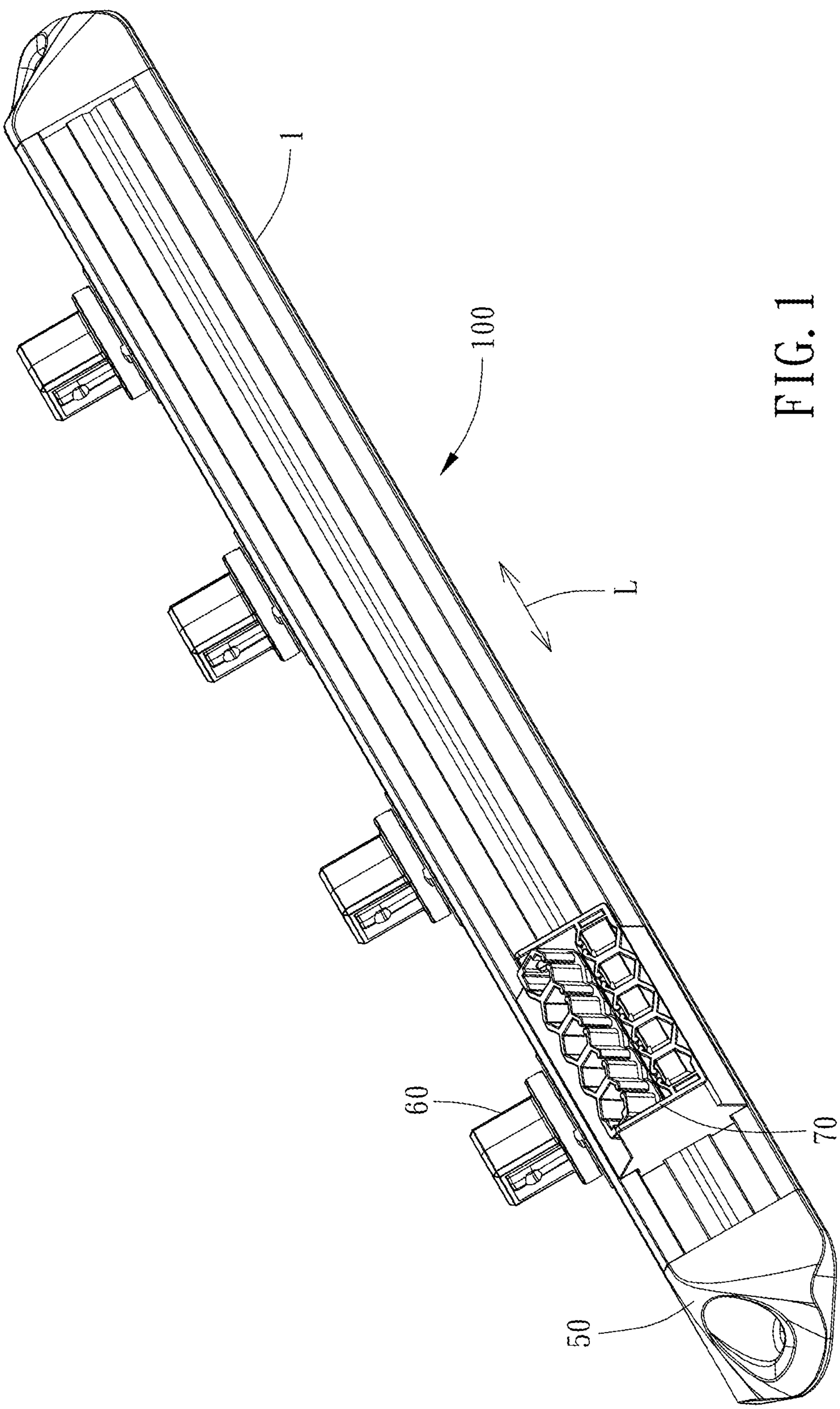
FIG. 1 is a stereogram of an exemplary embodiment of the present invention.
Figure 2:
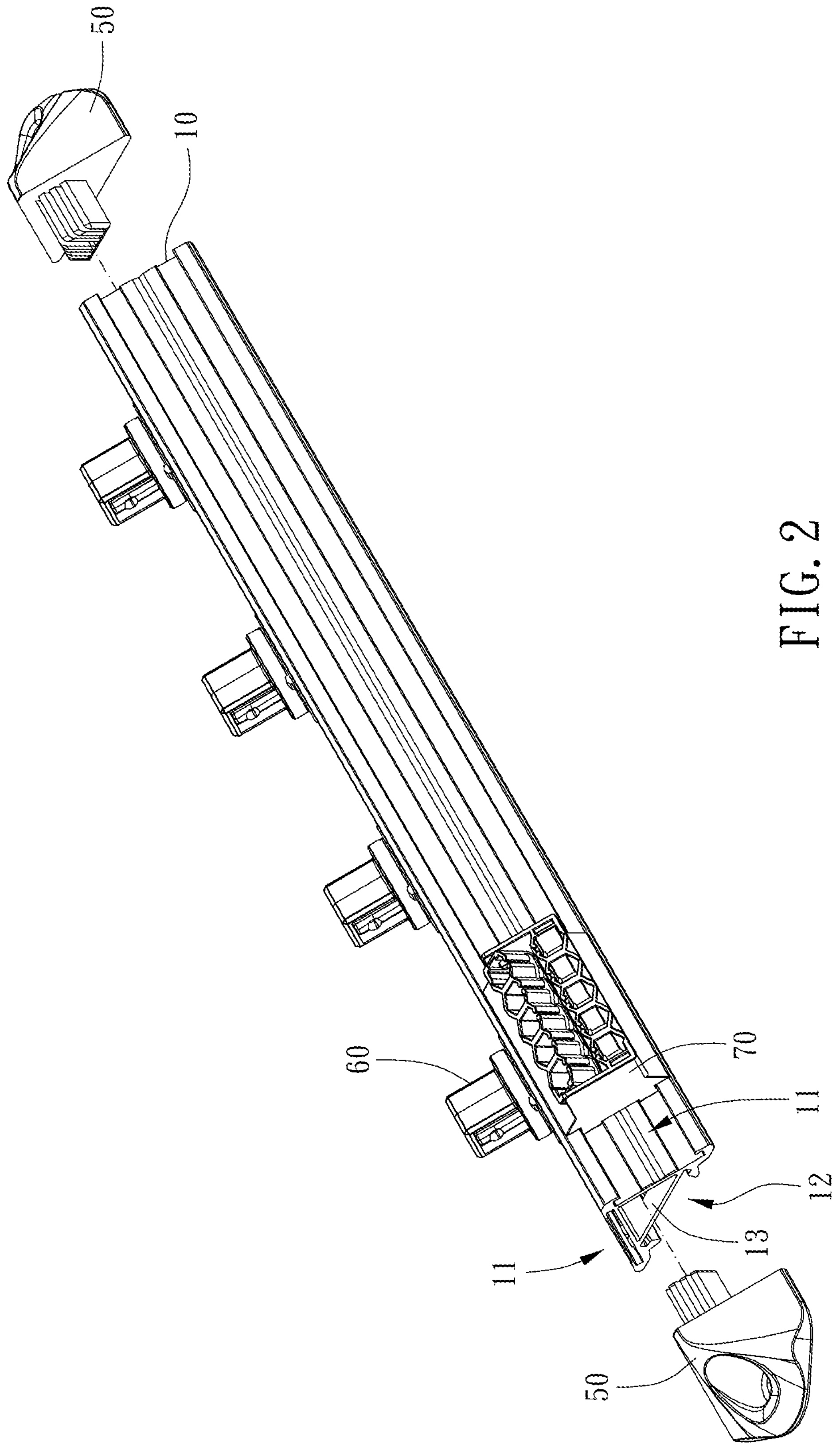
FIG. 2 is a breakdown drawing of an exemplary embodiment of the present invention.
Figure 3:
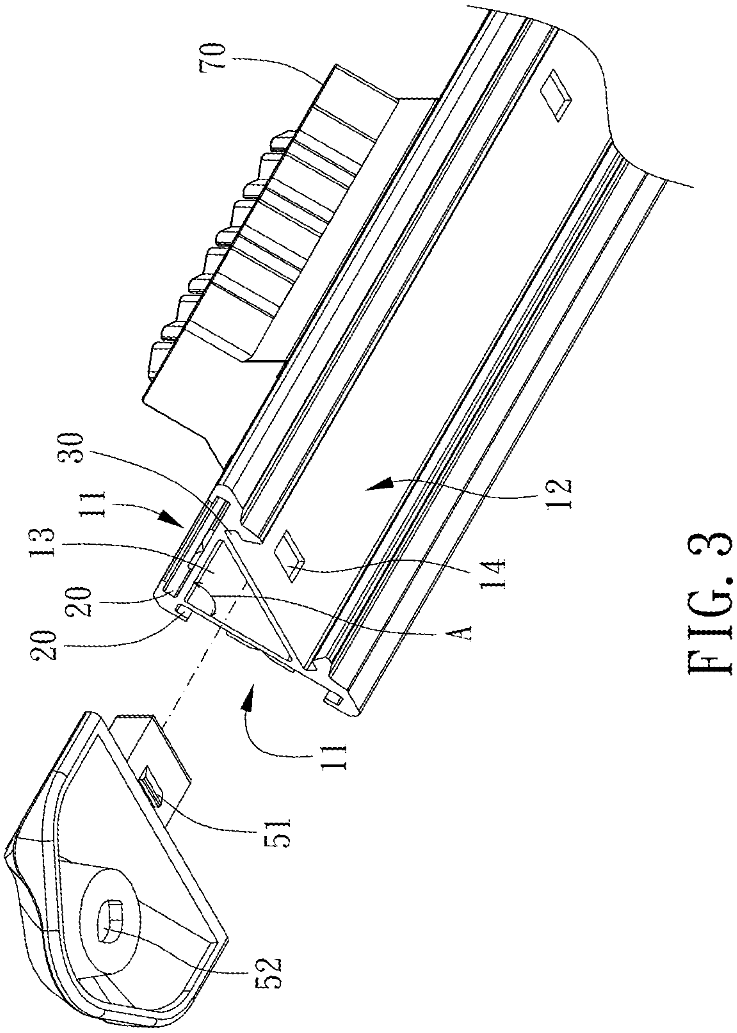
FIG. 3 is a partial breakdown drawing of an exemplary embodiment of the present invention.
Figure 4:
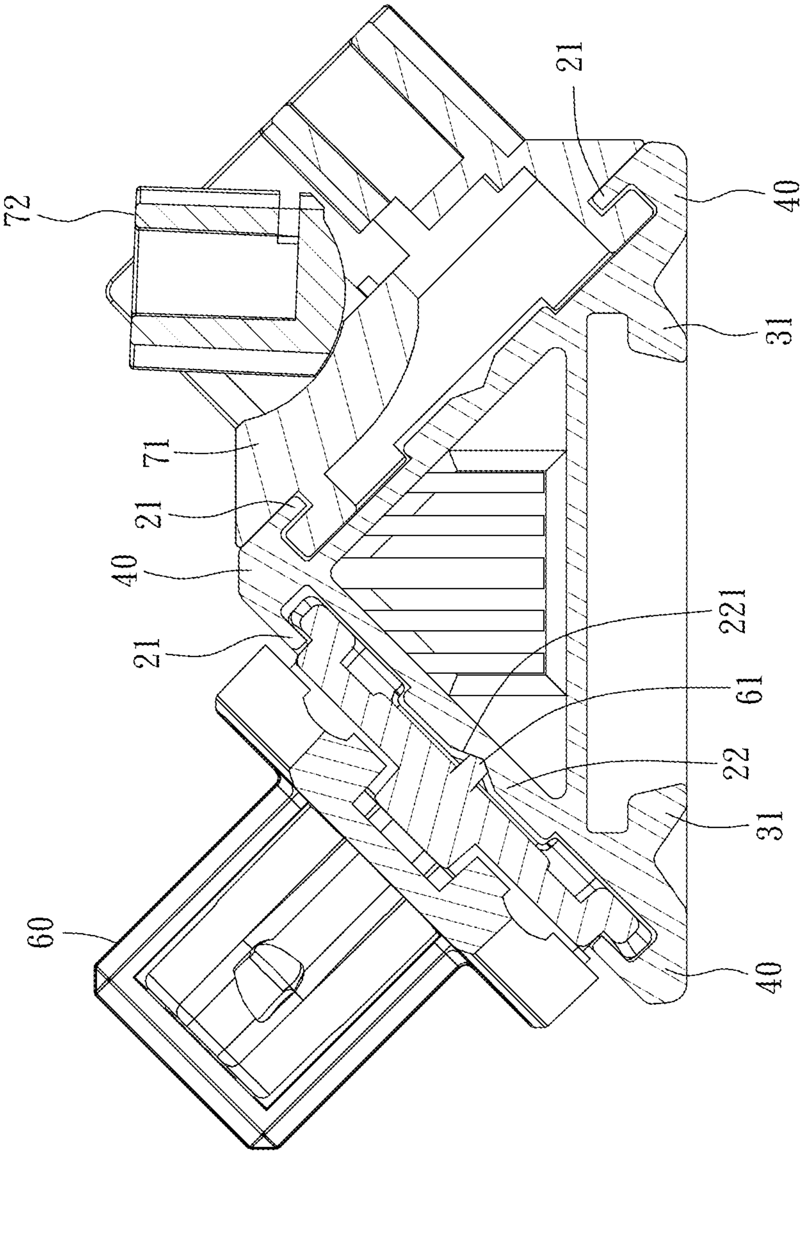
FIG. 4 is a cross-sectional view of an exemplary embodiment of the present invention.
Figure 5:
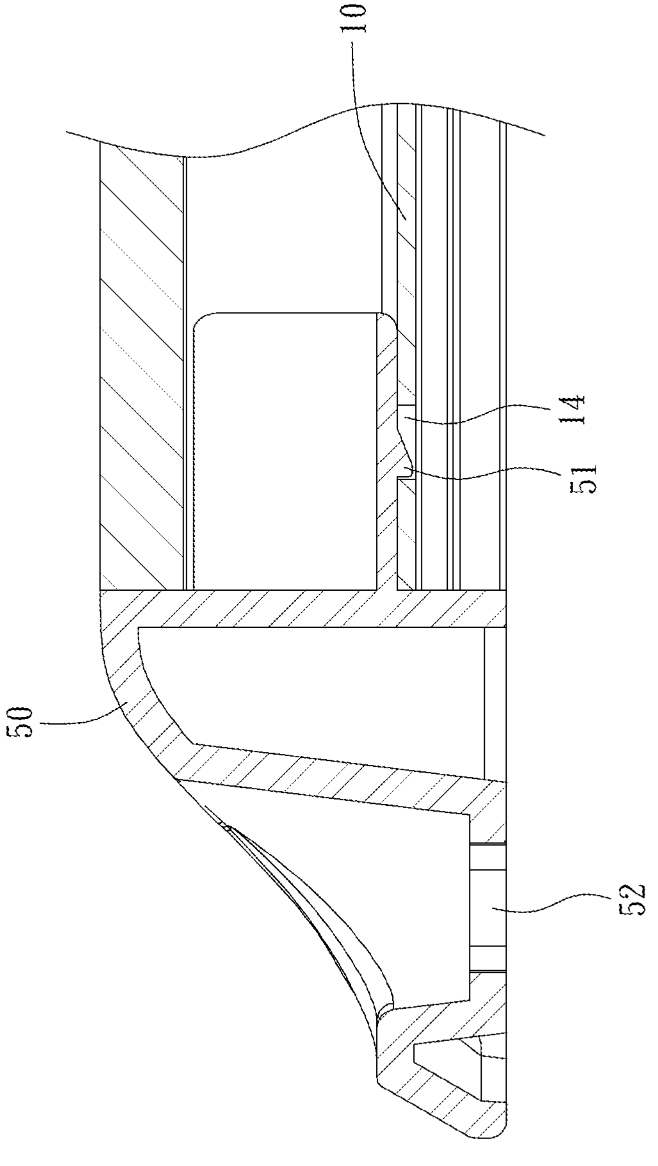
FIG. 5 is a partial enlarged cross-sectional view of an exemplary embodiment of the present invention.

Please refer to FIGS. 1 to 5 for an exemplary embodiment of the present invention. A tool holder rail 1 of the present invention includes an elongate main body 10 and two rail slots 20.

The elongate main body 10 extends in a longitudinal direction L and includes two mounting sides 11 extending in the longitudinal direction L. The two mounting sides 11 are inclined to each other with an included angle A therebetween. The included angle A ranges from 45.0 to 150.0 degrees (such as 90 degrees, 120 degrees or 135 degrees). The two rail slots 20 are disposed on the two mounting sides 11, respectively. Each of the two rail slots 20 includes two flanges 21 extending in the longitudinal direction L and toward each other. Each of the two rail slots 20 is configured for slidable engagement of a tool seat. As such, it is capable of storing more tools and has a small volume with a single one a tool holder including the tool holder rail 1.

Preferably, the elongate main body 10 is integrally formed of one piece, and preferably made of metal such as aluminum, aluminum alloy or the like. The two flanges 21 of each of the two rail slots 20 are parallel to the longitudinal direction L and the two mounting sides 11, which is conducive to smooth movement of the tool seat.

In this embodiment, the tool holder rail 1 further includes an attachment slot 30 disposed on an attachment side 12 of the elongate main body 10, and the two mounting sides 11 and the attachment side 12 are connected to one another so that the elongate main body 10 is of a triangle configuration. The attachment slot 30 includes two flanges extending in the longitudinal direction L, extending toward each other, and extending in a direction perpendicular the longitudinal direction L. Each of the two flanges 31 of the attachment slot 30 is thicker than each said flange of each said mounting side 11, which provides large structural strength.

The tool holder rail 1 further includes corner portions 40, a first one of the corner portions 40 is integrally connected to and between two said flanges 21 of the two rail slots 20, a second one of the corner portions 40 is integrally connected to and between one of the two flanges 21 of one of the two rail slots 20 and one of the two flanges 31 of the attachment slot 30, a third one of the corner portions 40 is integrally connected to and between one of the two flanges 21 of the other of the two rail slots 20 and the other of the two flanges 31 of the attachment slot 30, and the two flanges 31 of the attachment slot 30 are flush with two of the corner portions 40 at the attachment side 12. Specifically, each of the two flanges 31 of the attachment slot 30 and one of the corner portions 40 form a toothed groove therebetween. As such, the tool holder rail 1 has a strong structure and can be attached to a mounting surface stably.

In this embodiment, a bottom of at least one of the two rail slots 20 includes an elongate projection 22 extending in the longitudinal direction L and wider than the two flanges 21 of each of the two rail slots 20. The elongate projection 22 reinforces the structural strength of the configuration of the rail slot. Specifically, the elongate projection 22 includes an elongate toothed groove 221. Preferably, the elongate main body 10 further includes two end openings 13, and two caps 50 are preferably inserted in the two end openings 13 and close the two end openings 13, respectively. Specifically, the elongate main body 10 further includes engaging holes 14, each of the two caps 50 includes a snap bump 51 which is releasably engaged in one of the engaging holes 14, and each of the two caps 50 further includes a through hole 52 for a fastener to disposed therethrough so that the tool holder rail 1 can be stably secured.

The present invention further provides a tool holder 100. The tool holder 100 includes the aforementioned tool holder rail 1 and a tool seat 60, 70 slidably engaged within one of the two rail slots 20, wherein the tool seat 60, 70 is configured for mounting of a tool such as a tool bit, socket or the like. The tool seat 60 may include a rib 61 projecting to be within the elongate toothed groove 221. Alternatively, the tool seat 70 may include a base 71 and a tool connector 72, the base 71 is slidably engaged within one of the two rail slots 20, and the tool connector 72 is rotatably connected to the base 71 and configured for mounting of a tool such as a tool bit.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool holder rail including:

an elongate main body extending in a longitudinal direction and including two mounting sides extending in the longitudinal direction, the two mounting sides being inclined to each other with an included angle therebetween;

two rail slots disposed on the two mounting sides, respectively, each of the two rail slots including two flanges extending in the longitudinal direction and toward each other, each of the two rail slots being configured for slidable engagement of a tool seat;

an attachment slot disposed on an attachment side of the elongate main body; and wherein the two flanges of each of the two rail slots are parallel to the longitudinal direction and the two mounting sides;

wherein the two mounting sides and the attachment side are connected to one another so that the elongate main body is of a triangle configuration.

2. The tool holder rail of claim 1, wherein the included angle ranges from 45.0 to 150.0 degrees.

3. The tool holder rail of claim 1, wherein the attachment slot includes two flanges extending in the longitudinal direction, extending toward each other, and extending in a direction perpendicular the longitudinal direction.

4. The tool holder rail of claim 3, further including corner portions, wherein a first one of the corner portions is integrally connected to and between the flanges of the two rail slots, a second one of the corner portions is integrally connected to and between one of the two flanges of one of the two rail slots and one of the two flanges of the attachment slot, a third one of the corner portions is integrally connected to and between one of the two flanges of the other of the two rail slots and the other of the two flanges of the attachment slot, and the two flanges of the attachment slot are flush with two of the corner portions at the attachment side.

5. The tool holder rail of claim 4, wherein each of the two flanges of the attachment slot and one of the corner portions form a toothed groove therebetween.

6. The tool holder rail of claim 1, wherein a bottom of at least one of the two rail slots includes an elongate projection extending in the longitudinal direction and wider than the two flanges of each of the two rail slots.

7. The tool holder rail of claim 6, wherein the elongate projection includes an elongate toothed groove.

8. The tool holder rail of claim 1, wherein the elongate main body further includes two end openings, and two caps are inserted in the two end openings and close the two end openings, respectively.

9. The tool holder rail of claim 8, wherein the elongate main body further includes engaging holes, and each of the two caps includes a snap bump which is releasably engaged in one of the engaging holes.

10. The tool holder rail of claim 8, wherein each of the two caps includes a through hole for a fastener to disposed therethrough.

11. A tool holder including the tool holder rail of claim 1, wherein the tool seat slidably engaged within one of the two rail slots.

12. The tool holder of claim 11, wherein a bottom of at least one of the two rail slots includes an elongate projection extending in the longitudinal direction, the elongate projection includes an elongate toothed groove, and the tool seat includes a rib projecting to be within the elongate toothed groove.

13. The tool holder of claim 11, wherein the tool seat includes a base and a tool connector, the base is slidably engaged within one of the two rail slots, and the tool connector is rotatably connected to the base and configured for mounting of a tool.

* * * * *